United States Patent [19]
Oswald et al.

[11] Patent Number: 5,442,783
[45] Date of Patent: Aug. 15, 1995

[54] METHOD AND APPARATUS FOR TRANSFERRING DATA BASE INFORMATION

[75] Inventors: Gary J. Oswald, Elk Grove Village; Mark Banghart, Carpentersville; Michael E. Burke, Lake Zurich, all of Ill.

[73] Assignee: Motorola, Inc., Schaumburg, Ill.

[21] Appl. No.: 126,003

[22] Filed: Sep. 24, 1993

Related U.S. Application Data

[63] Continuation of Ser. No. 468,400, Jan. 22, 1990, abandoned.

[51] Int. Cl.$^6$ .................. G06F 17/00; G06F 17/30
[52] U.S. Cl. .................... 395/600; 395/500; 364/282.1; 364/282.4; 364/284; 364/284.4; 364/DIG. 1
[58] Field of Search .............. 395/200, 500, 600; 364/282.1, 282.4, 284, 284.4

[56] References Cited

U.S. PATENT DOCUMENTS

| | | | |
|---|---|---|---|
| 4,205,371 | 5/1980 | Feather | 395/600 |
| 4,259,549 | 3/1981 | Stehman | 379/216 |
| 4,442,321 | 4/1984 | Stehman | 379/220 |
| 4,531,186 | 7/1985 | Knapman | 395/600 |
| 4,553,205 | 11/1985 | Porchia | 395/375 |
| 4,604,686 | 8/1986 | Reiter et al. | 364/200 |
| 4,691,278 | 9/1987 | Iwata | 395/375 |
| 4,829,554 | 5/1989 | Barnes et al. | 379/58 |
| 4,908,759 | 3/1990 | Alexander, Jr. et al. | 395/600 |
| 4,975,830 | 12/1990 | Gerpheide et al. | 364/200 |
| 5,187,787 | 2/1993 | Skeen et al. | 395/600 |

OTHER PUBLICATIONS

Bob Dargent, "AURORA System Lights the way in Cellular Mobile Radio Market" Telephony, Aug. 1982, pp. 28–29, 32, 34.

Betteridge et al, "Versatile, Multi-featured Mobile Systems Take to the Road" Telephony, Aug. 1982, pp. 29, 36, 40.

"Message Handling Systems: Presentation Transfer Syntax and Notation" Fascicle VII.7-Rec.X.409 pgs. 62–69 and 95–97.

*Primary Examiner*—Kevin A. Kriess
*Assistant Examiner*—Dennis M. Butler
*Attorney, Agent, or Firm*—Val Jean F. Hillman

[57] ABSTRACT

The present invention discloses a method of maintaining forward and backwards compatibility between various software releases, utilizing different database information and structures. During database transfers the initiating, master, processor requests a responding, slave, process to first provide a description of the slave's database language. Next, the master processor compares the slave's database language description to that of its own. From this comparison, the master develops a working language. The working language is then sent to the slave processor, and thereafter used by both processors when transferring database information. This method supports the update and transfer of database records pursuant to the installation of new software releases. Alternatively, this technique supports the transfer of database information between processors that have dissimilar database structures. In either scenario, the disclosed method of database transfer is software release independent, avoids the need of complex conversion programs, and has greatly enhanced overall information throughput.

8 Claims, 2 Drawing Sheets

FIG. 2

SLAVE LANGUAGE

| 4 | 3 | 0 | 1 | (LANGUAGE COUNT, ENTRY SIZE, COMPACTED LENGTH, DB TYPE) |
|---|---|---|---|---|
| 1 | 0 | 5 |   | (FEATURE ID, FEATURE TYPE, FEATURE LENGTH) |
| 2 | 1 | 3 |   | (FEATURE ID, FEATURE TYPE, FEATURE LENGTH) |
| 3 | 1 | 1 |   | (FEATURE ID, FEATURE TYPE, FEATURE LENGTH) |
| 5 | 0 | 1 |   | (FEATURE ID, FEATURE TYPE, FEATURE LENGTH) |

FIG. 3

MASTER LANGUAGE

| 6 | 3 | 0 | 1 | (LANGUAGE COUNT, ENTRY SIZE, COMPACTED LENGTH, DB TYPE) |
|---|---|---|---|---|
| 1 | 0 | 5 |   | (FEATURE ID, FEATURE TYPE, FEATURE LENGTH) |
| 2 | 1 | 3 |   | (FEATURE ID, FEATURE TYPE, FEATURE LENGTH) |
| 3 | 1 | 1 |   | (FEATURE ID, FEATURE TYPE, FEATURE LENGTH) |
| 5 | 0 | 1 |   | (FEATURE ID, FEATURE TYPE, FEATURE LENGTH) |
| 6 | 0 | 1 |   | (FEATURE ID, FEATURE TYPE, FEATURE LENGTH) |
| 7 | 0 | 1 |   | (FEATURE ID, FEATURE TYPE, FEATURE LENGTH) |

FIG. 4

WORKING LANGUAGE

| 4 | 3 | 7 | 1 | (LANGUAGE COUNT, ENTRY SIZE, COMPACTED LENGTH, DB TYPE) |
|---|---|---|---|---|
| 1 | 0 | 5 |   | (FEATURE ID, FEATURE TYPE, FEATURE LENGTH) |
| 2 | 1 | 3 |   | (FEATURE ID, FEATURE TYPE, FEATURE LENGTH) |
| 3 | 2 | 1 |   | (FEATURE ID, FEATURE TYPE, FEATURE LENGTH) |
| 5 | 0 | 1 |   | (FEATURE ID, FEATURE TYPE, FEATURE LENGTH) |

FIG. 5

COMPACTED DATABASE INFORMATION

| 1 | 1 | 1 | 1 | 1 | 2,3 | 5 | (FEATURE IDS) |
|---|---|---|---|---|-----|---|---|

METHOD AND APPARATUS FOR TRANSFERRING DATA BASE INFORMATION

This is a continuation of application Ser. No. 07/468,400, filed Jan. 22, 1990, and now abandoned.

TECHNICAL FIELD

This invention relates generally to a method of software management, and more specifically to the process of maintaining forward and backward compatibility for computer systems utilizing various software releases containing different database information.

BACKGROUND OF THE INVENTION

In computer systems that employ distributed networks where database information is frequently transferred, there exists the need to maintain both forward and backwards compatibility among the various software releases generated during a systems lifetime. Examples of computer systems utilizing distributed networks are Local Area Networks (LANs) and Wide Area Networks (WANs). In these computing environments, forward compatibility describes the relationship between a progression of software releases, whereby installation of a new software release does not compromise the fitness, form, or function achieved under previous software versions. In essence, the new software performs like the old, despite the inclusion of additional features. Backwards compatibility is achieved when the reinstallation of a previous software version does not render the system inoperable.

This same need arises in computer systems that employ redundant database information which is either compared or exchanged. One such example is a telephony computer designed to perform the switching of customer calls. An example is the Motorola Electronic Mobile Exchange (EMX) family of cellular switches. These include the Motorola EMX 100, 250, 500, and 2500 switch families which support cellular radiotelephone services in several major metropolitan markets. The interested party may receive full system/hardware descriptions on such devices by contacting Motorola's Cellular Publishing Services at 1501 W. Shure Drive Shure Drive, Arlington Heights, Ill. 60004 and requesting Instruction Manuals 68P8105196E-99E, 68P81052E-54E and 68P81056E for the EMX 100–500 Family of Switches or Instruction Manuel 68P09201A07-A for the EMX2500 electronic switch all of which are incorporated herein by reference.

Simply stated, a telephony computer is nothing more than a large switch that employs sophisticated software capable of managing and directing multiple customer calls per second. In this effort, it is necessary to develop a comprehensive customer database capable of reporting the various telephone subscribers, their individual accounts, and various service features. Presently, most of the customer database information is of a static nature; not subject to frequent change and therefore suitable for storage in backup form. With the expansion of customized telephone services, however, a growing portion of the database information is dynamic.

Unlike static, dynamic information is customer generated, subject to certain alteration, and therefore totally unsuitable for hard copy storage. Typical examples of dynamic information include the programmable automatic redial, call forwarding, busy transfer, no answer transfer, or voice mailbox telephone options. While this personalized information is not maintained in hard copy form, it is extremely valuable to the average system subscriber and therefore must be jealously safeguarded during database transfers if quality phone service is to be provided.

In this effort to insure quality service, EMX computers employ a redundant or secondary switch that is a duplication of the primary switch, and capable of continuing service if the primary is ever disabled. During normal operation, the primary and secondary customer databases are frequently compared. These subscriber audits are performed in order to assure primary and secondary database equivalence. In addition, it is quite common for telephony computers to perform subscriber file transfers, wherein the subscriber information residing in one computer is transferred to a different computer. Another frequently performed operation is subscriber feature preservation. This is the process whereby dynamic database information is updated and transferred to the secondary switch the instant the primary becomes disabled. In each of these operations, the existence of forward and backwards compatibility is imperative in order to assure the proper handling and transfer of the appropriate database records. This is especially true for the transfer of dynamic information which is constantly changing and for which there is no hard copy backup.

Forward and backwards compatibility is normally achieved on an individual software release basis. It will be appreciated by those skilled in the art that a typical software update may include the correction of an old software version or the addition of new system features. Each enhancement, however, requires altering the database records supporting the capture of the obsolete or newly acquired information. Such changes present a considerable challenge to the programmer attempting to implement forward and backwards compatibility, because communication between differing database structures may result in the loss of important information. In the telephone business, lost information represents an intolerable breach in the quality of service.

For example, assume an original software release version 1.0 is supported by customer database #1, which contains several records each having elements A, B, and C. The updated release of this software is version 2.0 which is supported by customer database #2. Database #2 also contains several records, however, these records contain elements A, B, and D. During the forward transfer of database #1 information into database #2, it is understood that the software associated with database #2 will disregard the information found in element C. Likewise, during the backwards transfer of database #2 information into database #1, the software associated with database #1 will not comprehend the information found in element D. Ultimately, this unrecognized data must be discarded by the software. Of note, the greater the difference between the subject databases and the more software releases to be encountered, the more complicated system software must be in order handle these inconsistencies and maintain compatibility.

Previous approaches suggest downloading the entire existing database, undesired records and all, and relying upon complex conversion programs capable of converting the original database to a format capable of being passed to the new database. While these programs are entirely capable of discarding obsolete records or ignoring the presence of new records, compatibility will remain a serious problem as the number of operating software releases escalates. Each new release must maintain compatibility with its predecessors, while the predecessors must often be updated in order to successfully communicate with newer releases. This represents a formidable task which is virtually impossible of being fault tolerant.

In order to avoid the needless waste associated with sending unused information across transmission lines of limited capacity, the prior art also suggests manually enter the appropriate database information. Due to the sheer size of some databases, however, manual entry depicts a labor intensive process which is extremely prone to operator error, and incapable of handling the real time demands imposed by dynamic database information.

It would therefore be extremely advantageous to provide a simplistic method for transferring database information between various processors having different database information or structures, while maintaining forward and backwards compatibility.

BRIEF DESCRIPTION OF THE DRAWINGS

FIG. 2 is a block diagram example of a slave process database language description;

FIG. 3 is a block diagram example of a master process database language description;

FIG. 4 is a block diagram example of the working language; and

FIG. 5 is an example of the compacted database information described by the working language of FIG. 4 in working language format.

DETAILED DESCRIPTION OF THE PREFERRED EMBODIMENT

Figure 1:
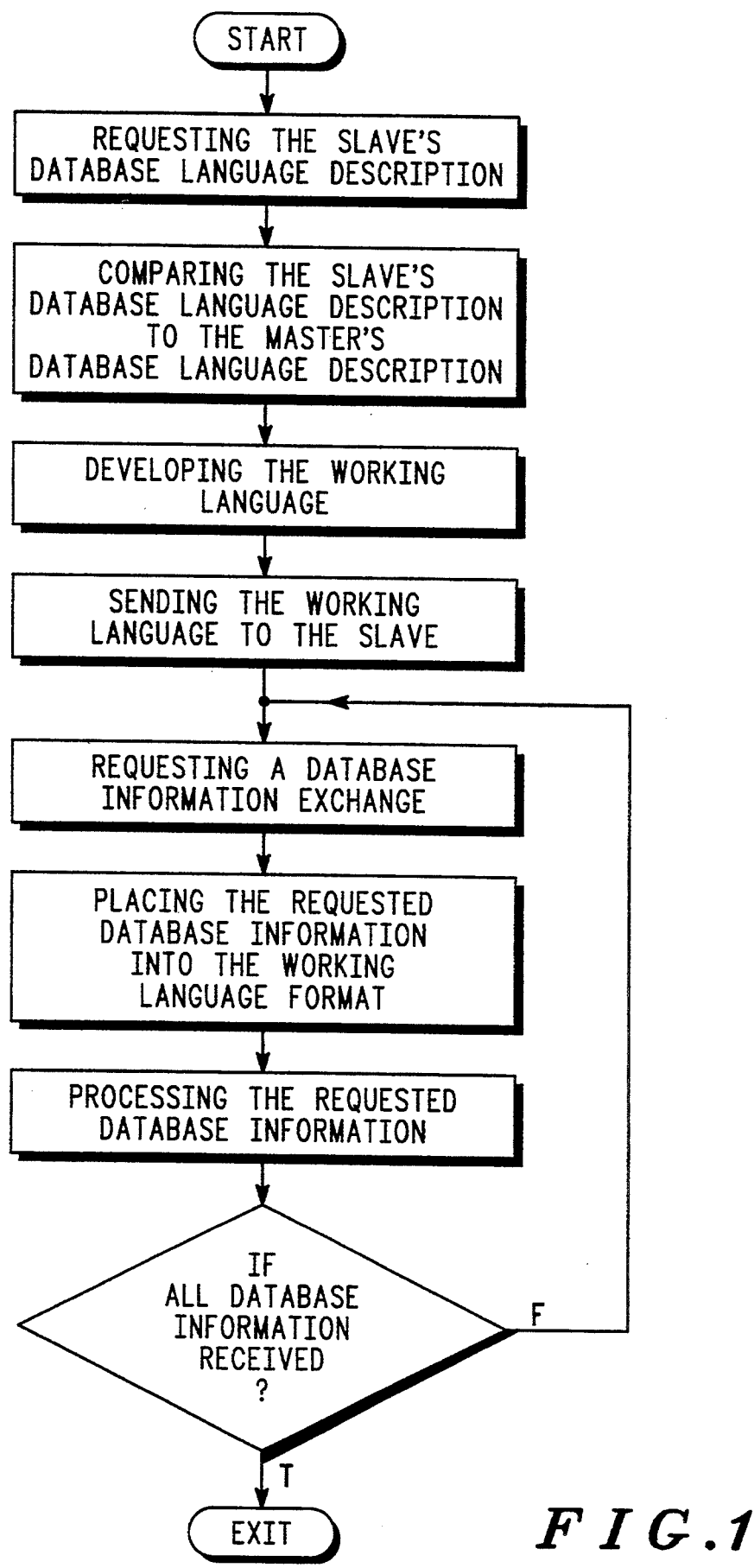
FIG. 1 is a flow chart diagram of the steps performed by a digital computer during database transfers in accordance with the present invention.

The present invention has general applicability within computer based devices and systems employing various software releases which typically contain different data base information. According to the preferred embodiment, these devices are processors utilized within Motorola's family of EMX telephony computers. As such, they may contain different versions of system software during a processor upgrade and/or installation procedure. In order to maintain both forward and backwards compatibility for such systems during software upgrades, the data base transfer program depicted in FIG. 1 is executed.

FIG. 1 is a flow chart diagram of the steps performed by such a telephony computer during a database transfer in accordance with the present invention. According to this method, an initiating processor, hereinafter referred to as the master processor requests an at least a second processor, hereinafter referred to as the slave processor to provide a description of the slave's database language. Upon receipt of this description, the master compares the slave's database language description to that of the master's. Looking specifically to the areas of comparison, the master collects the items common to either languages. The information that is foreign to both languages is ignored. In this way the master develops a new database language description which facilitates communication between the master and the slave based upon their mutuality. As previously mentioned, this common description is called the working language.

The working language is the intersection between the master and the slave database language descriptions. As such, it contains the set of elements common to both languages. It therefore represents an area of mutual compatibility between various database configurations.

Once the working language is developed, its description is sent back to the slave process. From this point, both processes are capable of requesting the exchange of database information. In operation, the master and the slave employ the working language in order to process the actual database information exchanged. In this context, processing includes, but is not limited to, compacting the database information into the condensed working language format, or expanding compacted database information into its expanded form for subsequent handling.

This disclosed method of transferring database information resolves the problem of maintaining forward and backwards compatibility during software release updates by creating a separate database language description compatible with both releases. In this way database translations are achieved in a method independent of complex conversion programs.

When a database information exchange request is received, the responding (slave) process extracts information from its database and places it into the working language format. Since this format is understood by both master and slave, communication is effectuated, despite the differences between these software releases.

Upon receipt of the requested information, the requesting (master) process will process the requested database information. Accordingly, the master will extract the requested information from the working language format and place it in the appropriate database records of its current configuration. At this point the master is capable of performing the previously mentioned subscriber audits, subscriber file transfers, or subscriber feature preservations, independent of the existing software releases.

Unlike the prior art, the information foreign to both processes is ignored during the development of the working language. This step avoids the needless waste associated with sending unused information across transmission lines, and storing that information prior to discard. As a results, the development of the working language greatly enhances overall information throughput due to these timely savings.

For illustrative purposes FIG. 2 is a block diagram example of a slave process database language description. As such, it depicts the type of information found in a slave database. While the description does not contain the actual values stored in the slave database, it nonetheless describes the format these actual values will follow.

The first line of the database description is called the language structure. This section performs a preamble function and serves to describes the body of the language. The variables the language structure uses in its description are: Language count, Entry size, Compacted length, and Database type. By definition: Language count gives the number of entries to be found in the body of the language; Entry size gives the size of each entry; Compacted length is not used in the slave database language description; and Database type identifies the type of database this language describes.

According to the example in FIG. 2, the slave database language description has only four entries. Additionally, each entry has three variables. Compacted length is only used by the working language, therefore a zero fills that variable. Compacted length will be further explained in connection with the description of the working language. Finally, the Database type carries a designation of one. The Database type variable is provided in order to accommodate system flexibility. In the instance that several different database formats are employed, this variable allows the system to differentiate the various formats during working language development.

Immediately following the language structure appears the body of the language. The body consists of numerous entries that describe the various features of the slave process. In this effort, each entry employs variables that describe the features format. The variables the entries use in their description are: Feature ID; Feature type, and Feature Length.

As previously mentioned, each entry corresponds to an individual process feature. For identification purposes, each entry is therefore given a unique identifier called a Feature ID. After designation, that Feature ID will remain dedicated to that specific feature across all future software releases.

For example, assume the slave process is capable of supporting the telephone option, call forwarding. Within the slave's database language description, there will be an entry describing this particular feature. For identification purposes, assume the entry describing call forwarding is given the Feature ID 1. In each new software release utilizing call forwarding, there will be an entry identified as Feature ID 1, which is identical in all respects to the slave's entry describing the call forwarding option. For those releases not utilizing call forwarding, there will be no entry having Feature ID 1.

Each entry will also have a Feature type variable. Feature type describes the form of the information utilized in this entry. There are three Feature types: byte type, bit type, and end bit type. If the feature is described in byte (s) of information then it is byte type, and is identified by the literal value of 0. If the feature is described in individual bit(s) of information, then it is bit type and identified by the literal value of 1. End bit type is only used by the working language, and will therefore be explained in connection with the description of the working language.

Finally, each entry will have a Feature length variable. This variable designates the length of the database feature being described. This length will be in bytes of information if the feature is of the byte type, or in bits if the feature is of bit type.

Returning to FIG. 2, it will be appreciated that the first entry in the slave's database description describes a feature identified as Feature ID 1. Feature ID 1 comprises five bytes of information. The next entry describes Feature ID 2, which describes a feature three bits in length. The next entry is Feature ID 3, which describes a feature consisting of a single bit of information. Finally, the last entry describes a feature designated as Feature ID 5. Feature ID 5 describes a feature that consists of a single byte of information.

In comparison, FIG. 3 is a block diagram example of a master process database language description. At a glance, the language structure reveals that this database description contains six entries which utilize the same variables as the slave database description. This is recognizable because both the slave and the master have identical entry size and database type designations. In addition, the master process employs all the features that were available under the slave process configuration. The difference is that the master process utilizes two additional features; Feature ID's 6 and 7 which are both a single byte in length.

According to the present invention, when either process desires to initiate communications with the other, the requesting process is deemed the master. The master therefore requests the database language description of the responding or slave process, compares the slave's description of the database language body to that of its own, and develops a working language.

FIG. 4 is the block diagram example of the working language developed from the comparison of FIG. 2 and FIG. 3. The working language is merely the intersection between the master and slave database languages, and therefore contains only the Feature ID's common to both. Because the master utilized all the features present in the slave process, FIG. 4 is almost identical to the description in FIG. 2. Of course this will not always be the case, but for illustrative purposes, it will be appreciated that the intersection between the body of the slave's database language description and that of the master's is represented in FIG. 4. In this example, the only areas of difference are the previously mentioned end bit and compacted length variables.

The end bit type variable is a pseudo feature type variable specific to the working language, thus it will only appear in the body of the working language, and only as a Feature type variable entry. In essence, the end bit literal informs requesting software when the last bit of the bit type information stored in a particular byte has been reached. The software is thereby provided an indication when to point to the next byte of information. According to FIG. 4 Feature ID 3 is the last bit type information common to both the master and slave. Therefore, Feature ID 3 has the end bit literal value of 2 as the feature type designation.

The only remaining difference is the compacted length variable. As previously discussed, compacted length is a field variable used only by the working language. This variable informs the requesting software of the length of compacted database information, i.e., the width of the information in the working language format.

As previously mentioned, all database information is compacted prior to exchange in order to save space. For example, Feature ID's 2 and 3 require a total of 4 bits of representation. These two Feature ID's will therefore be placed in a single byte prior to transmission to the requesting process. As a results, the compacted database information will comprise five bytes of data for Feature ID 1, a sixth byte for data pertaining to Feature ID's 2 and 3 data, and a seventh byte for Feature ID 5 data. The compacted database information described by the working language is 7 bytes in length. Accordingly, the compacted length variable for the working language is 7. FIG. 5 is an example of the compacted database information described by the working language of FIG. 4.

In review, a method of maintaining backward and forwards compatibility between various software releases having different database information has been described. According to the present invention, various software releases seeking to communicate, compare database structures and develop a common language. This common or working language facilitates subsequent database transfers, independent of each process software release. It will nonetheless be appreciated that this disclosed method will also work effectively wherein the various software releases contain the same information or structure.

While only particular embodiments of the invention have been shown and described herein, it will be obvious that additional modifications may be made without departing from the spirit of this invention. It is therefore not intended that this invention be limited, except as indicated by the appended claims.

What is claimed is:

1. A data base transfer controller for use with a digital computer having a first processor, for performing database information transfers between the computer and at least a second processor device coupled to the computer via a communications network, each processor having a data base that may be different in structure and number of data base elements, the controller comprising:

means for identifying the first processor's data base elements;

means for identifying the at least second processor's data base elements, the at least second processor's data base elements being different in structure or number of data base elements than the first processor's data base elements;

means, coupled to the first and the at least second processor, for comparing the identified data base elements to determine those elements common to the first and the at least second processor data bases;

means, coupled to the first and the at least second processor, for developing a working language from the data base elements common to the first and the at least second data base elements;

means, coupled to the first and the at least second processor, for communicating the working language to the first and the at least second processor; and means, coupled to the first and the at least second processor, for commencing transfers of data base information between the first and the at least second processor as a function of the working language.

2. The controller of claim 1 wherein the means for developing a working language further comprises means for ignoring uncommon data base elements within the first and the at least second processor data bases.

3. The controller of claim 1 wherein, upon receipt of the working language, either processor may initiate data base information transfers.

4. The controller of claim 1 wherein the means for identifying the first processor's data base elements is the first processor.

5. The controller of claim 1 wherein the means for identifying the at least second processor's data base elements is the second processor.

6. The controller of claim 1 wherein the means for comparing the identified data base elements comprises at least one of the processor's coupled to the comminations network.

7. The controller of claim 1 wherein the means for developing a working language is at least one of the processor's coupled to the comminations network.

8. The controller of claim 1 wherein the working language is developed without resort to data base conversion routines.

* * * * *